United States Patent
Jo (10) Patent No.: US 8,320,060 B2
(45) Date of Patent: Nov. 27, 2012

(54) OPTICAL SYSTEM FOR CAMERA

(75) Inventor: Yong Joo Jo, Osan-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/654,672

(22) Filed: Dec. 29, 2009

(65) Prior Publication Data

US 2011/0069401 A1    Mar. 24, 2011

(30) Foreign Application Priority Data

Sep. 22, 2009    (KR) .................. 10-2009-0089592

(51) Int. Cl.
*G02B 9/34* (2006.01)
(52) U.S. Cl. ........................................ 359/773
(58) Field of Classification Search ........... 359/772–774
See application file for complete search history.

(56) References Cited

U.S. PATENT DOCUMENTS

| | | | |
|---|---|---|---|
| 7,274,518 B1 * | 9/2007 | Tang et al. ................ | 359/772 |
| 2007/0188890 A1 * | 8/2007 | Jo et al. .................... | 359/773 |
| 2009/0109549 A1 * | 4/2009 | Yasuhiko ................. | 359/715 |

FOREIGN PATENT DOCUMENTS

| | | |
|---|---|---|
| JP | 2007-11237 | 1/2007 |
| JP | 2007-219079 | 8/2007 |
| JP | 2009-20182 | 1/2009 |
| KR | 10-0703469 | 4/2007 |
| KR | 10-2007-0111683 | 11/2007 |

OTHER PUBLICATIONS

Pedrotti, Frank L Pedrotti Leno S and Pedrotti Leno M Introduction to Optics, 2007, Pearson Prentice Hall, pp. 50-56.*
http://en.wikipedia.org/wiki/Aperture, May 29, 2012.*
Chinese Office Action mailed Mar. 12, 2012 issued in corresponding Chinese Patent Application No. 200910265774.6.

* cited by examiner

*Primary Examiner* — James Greece

(57) ABSTRACT

The present invention relates to an optical system for a camera.
The optical system for a camera in accordance with the present invention includes: a first lens that has a positive refractive index and has a convex shape toward an object; a second lens that has a negative refractive index and has a concave shape at both surfaces; a third lens that has the positive refractive index and has the convex shape upwards; and a fourth lens that has the negative refractive index and has a concave surface on an object-side surface, and has at least one inflection point on an image surface. It is possible to implement a compact optical system for a camera which can be applied to a mobile communication terminal by improving design flexibility.

12 Claims, 12 Drawing Sheets

OPTICAL SYSTEM FOR CAMERA

CROSS-REFERENCE TO RELATED APPLICATIONS

This application claims the benefit of Korean Patent Application No. 10-2009-0089592 filed with the Korea Intellectual Property Office on Sep. 22, 2009, the disclosure of which is incorporated herein by reference.

BACKGROUND OF THE INVENTION

1. Field of the Invention

The present invention relates to an optical system for a camera and, more particularly, to an optical system for a camera in which an aperture stop is disposed between lenses and all lenses constituting the optical system are configured by aspheric plastic lenses.

2. Description of the Related Art

In recent years, as mobile communication devices such as a mobile communication terminal, a PDA, and a smart phone are increased in the quantity thereof and a service provided through a communication technology becomes various, various types of additional functions are provided in addition to a basic communication function.

Among them, a camera module is essentially mounted in the mobile communication devices for photographing or transmitting an image and video calling and various serves are provided by using an image photographed through a camera module or new services are being developed in close succession.

In particular, in recent years, a decrease in size, a decrease in weight, and a decrease in cost are required with respect to the optical system constituted by the lens group mounted on the camera module and a pixel size of an image sensor constituted by a CCD or a CMOS gradually decreases, a high-resolution optical system is required.

As such, a plurality of lenses are used for the optical system to maintain high resolution and the optical system is preferably configured by using a glass lens having high optical transmittance and a high refractive index, but the optical system mounted in the mobile communication device is difficult to satisfy conditions of the decrease in size and the decrease in cost as a design of the optical system by characteristics of the optical system.

Therefore, the optical system mounted in the mobile communication device uses a plastic lens which can be easily molded and reduces the number of lenses as possible in order to decrease the size and save manufacturing cost, but the optical system uses a plastic lens having deteriorated optical performance in comparison with the glass lens, it is difficult to satisfy the optical performance by designing the optical system and design flexibility of the optical system is deteriorated due to the decrease in number of lenses.

Meanwhile, as the general design of the optical system, a design method in which an aperture stop is positioned at the forefront of each of the plurality of lenses and the plurality of lenses are arranged in sequence is adopted, but in this case, many aberrations are induced by light passing through an end of the aperture stop.

Further, when the aperture stop positioned at the forefront of the optical system is away from a first lens adjacent to an object, the size of the first lens increase and the length of the optical system increases, thereby remarkably deteriorating the optical performance.

SUMMARY OF THE INVENTION

Accordingly, the present invention is contrived to solve the disadvantages and problems and an object of the present invention is to provide an optical system for a camera in which the size of the lens most adjacent to the object is reduced and an adjacent aberration characteristic is improved by disposing an aperture stop in the rear part of a lens most adjacent to an object and configuring a surface of a lens at an object side, which is most adjacent to the top thereof as a concave surface while configuring the optical system by using four lenses.

The present invention has been invented in order to achieve the above-mentioned object and it is, therefore, an object of the present invention to provide an optical system for a camera that includes: a first lens that has a positive refractive index and has a convex shape toward an object; a second lens that has a negative refractive index and has a concave shape at both surfaces; a third lens that has the positive refractive index and has the convex shape upwards; and a fourth lens that has the negative refractive index and has a concave surface on an object-side surface, and has at least one inflection point on an image surface.

Preferably, a top surface of the fourth lens may be constituted by a surface concaved upwards on an optical axis and a convex surface convexed upwards in a peripheral part.

At this time, the top surface of the fourth lens may have both concave shapes in which it is concaved upwards and concaved toward the object on the optical axis.

Further, the optical system may meet Conditional Expression 1 with respect to an optical-axis direction size $$0.80 < TL/f < 1.45 \qquad \text{[Conditional Expression 1]}$$

$$0.7 < f1/f < 1.0 \qquad \text{[Conditional Expression 2]}$$

wherein TL represents a distance from the object-side surface to the image surface of the first lens, f represents an effective focus distance of the entire optical system, and f1 represents a focus distance of the first lens.

Further, in the optical system of the present invention, it is preferable that both surfaces of each of the first to fourth lenses is constituted by an aspheric surface.

At this time, the first lens L1 to the fourth lens L4 all may be configured by plastic lenses.

Further, an aperture stop for blocking unnecessary light among light passing through the optical system of the present invention may be provided between the first and second lenses.

The lenses of the optical system of the present invention meet Conditional Expressions 3 to 6 with respect to correction of color aberration for resolution, respectively, $$50 < v1 < 60 \qquad \text{[Conditional Expression 3]}$$

$$20 < v2 < 30 \qquad \text{[Conditional Expression 4]}$$

$$50 < v3 < 60 \qquad \text{[Conditional Expression 5]}$$

$$50 < v4 < 60, \qquad \text{[Conditional Expression 6]}$$

wherein v1 represents an abbe number of the first lens, v2 represents an abbe number of the second lens, v3 represents an abbe number of the third lens, and v4 represents an abbe number of the fourth lens.

As described above, in accordance with an embodiment of the present invention, it is possible to implement a compact optical system for a camera to which a mobile communication terminal can be applied through improving design flexibility by configuring all four lenses with aspheric plastic lenses while adopting four lenses in an optical system for a camera.

Further, the present invention is suitable for designing a small-sized optical system by disposing an aperture stop between a first lens and a second lens to decrease the size of the first lens.

In addition, the present invention can show an operation effect in which adjacent aberration characteristics including astigmatism and distortion aberration are improved by configuring a surface of a lens at an object side, which is most adjacent to an image surface as a concave surface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

A matter regarding to a configuration and an effect of a lamp driving circuit in accordance with the present invention will be appreciated clearly through the following detailed description with reference to the accompanying drawings illustrating preferable embodiments of the present invention.

However, the thickness, size, and shape of a lens are exaggerated for a detailed description of the present invention in a configuration diagram of a lens for each embodiment and in particular, a spherical or aspheric shape provided in the configuration diagram of the lens are just provided as an example and is not limited thereto.

Figure 1:
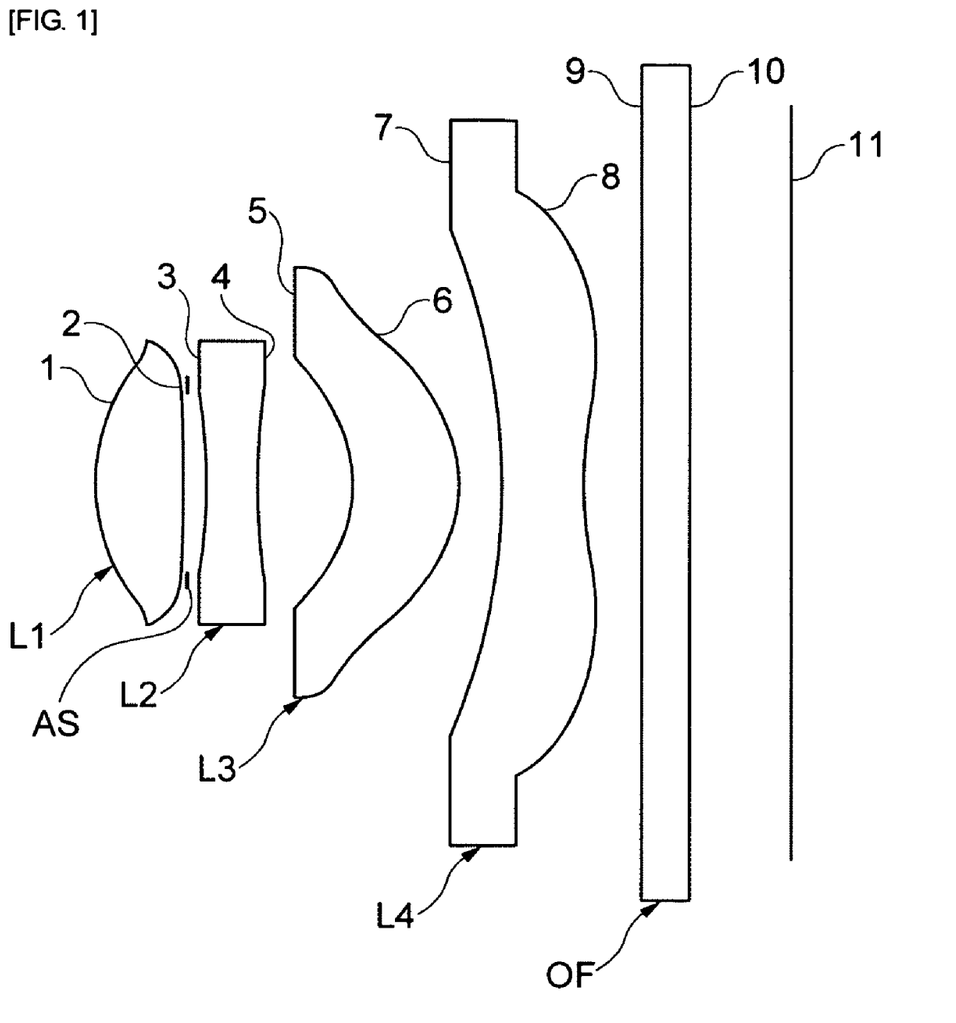
FIG. 1 is a configuration diagram showing a configuration of lenses of an optical system for a camera in accordance with a first embodiment of the present invention.

FIG. 1 is a configuration diagram of a lens showing a first embodiment of an optical system for a camera in accordance with the present invention. As shown in FIG. 1, the optical system for the camera in accordance with the present invention a first lens L1 having positive refractive index, a second lens L2 that has a concave shape on both surfaces thereof and has negative refractive index, a third lens L3 that has a convex shape on the top, and a fourth lens L4 having a negative refractive index sequentially from an object side. An aperture stop AS may be installed between the first lens L1 and the second lens L2.

Further, an infrared ray filter for blocking excessive infrared rays and an optical filter OF configured by a cover glass coated with the infrared ray filter may be provided in light passing through the optical system between the fourth lens L4 and an image surface 11.

In the optical system for the camera, it is possible to easily secure light intensity and reduce the size of the first lens L1 by positioning the aperture stop in the rear part of the first lens L1, that is, between the first lens L1 and the second lens L2, such that it is possible to configure a miniaturized optical system while using four lenses.

Further, both surfaces of the fourth lens L4 have concave shapes on an optical axis and an image surface 8 has a curvature point, such that it is possible to provide a proper focus distance by collecting luminous flux and as a result, it is possible to control distortion aberration at the end of the image surface 11.

For this, the image surface 8 of the fourth lens L4 is concaved toward the object side on the optical axis to improve a tolerance characteristic by a lens mold, the image surface 8 of the fourth lens L4 is preferably configured have a convex shape toward the image surface 11 around the optical axis.

In addition, the fourth lens L4 is concaved toward the top of an object surface 9 together with an image surface 10 on the optical axis, such that variation of the refractive index is reduced in a shape without the curvature point, thereby improving an optical characteristic and an aberration characteristic of light passing through the optical axis.

In the optical system for the camera in accordance with the present invention, the first lens L1 is configured by a lens having small refractive index n and large is configured by a lens having a small abbe value V and the second lens L2 is configured by a lens having large refractive index n and small abbe value V, such that a color aberration of the entire optical system can be corrected.

Meanwhile, by considering that the first lens L1 to the fourth lens L4 adopted in the present invention constitute a miniaturized optical system for a camera mainly adopted in a mobile communication terminal, the first lens L1, the second lens L2, the third lens L3, and the fourth lens L4 are formed by plastic lenses which can be easily processed, thereby increasing a decrease in weight of the optical system and improving processability, and saving manufacturing cost.

Further, a refraction surface of each of the first lens L3 to the fourth lens L4 is formed has the aspheric shape so as to facilitate correction of various aberrations, thereby improving design flexibility of the lens.

Therefore, in case of the optical system for the camera in accordance with the present invention, the first lens L1, the second lens L2, the third lens L3, and the fourth lens L4 are disposed to have positive, negative, positive, and negative refractive powers, respectively and the refraction surface of each lens has the aspheric shape which can be easily molded so as to improve the resolution of the optical system and enhance astigmatism and enhance distortion characteristics, while the aperture stop AS is disposed between the first lens L1 and the second lens L2 and the size of the fourth lens L4 is thus decreased so as to form a small-sized optical system.

In the optical system of the present invention having the above-mentioned configuration, operation effects of Conditional Expression 1 to 6 will be described in more detail.

$$0.80 < TL/f < 1.45 \qquad \text{[Conditional Expression 1]}$$

Herein, TL represents a distance from the object-side surface 1 of the first lens L1 to the image surface 11 and f is an effective focus distance of the entire optical system.

Conditional Expression 1 defines an optical-axis direction size of the entire optical system and is a condition for miniaturization of the optical system.

That is, in the case where the optical-axis direction size deviates from a lower limit of Conditional Expression 1, the size of the optical system is decreased, but a view angle is increased, such that the lens has a shape which cannot be actually manufactured and the length becomes too short, such that it is difficult for to the optical system to meet the optical characteristics required for the optical system.

Further, in the case where the optical-axis direction size deviates from an upper limit of Conditional Expression 1, it is advantageous in correction of the aberration, but an overall length is increased, thereby being contrary to miniaturization which is a technical characteristic of the optical system for the camera primarily adopted in the mobile communication terminal.

$0.7 < f1/f < 1.0$  [Conditional Expression 2]

Herein, f1 is a focus distance of the first lens and f is an effective focus distance of the entire optical system.

Conditional Expression 2 is a condition for defining the refractive power of the first lens L1. When f1 is increased by deviating from an upper limit of Conditional Expression 2, the power of other lens each constituted by a single lens, that is, the second lens L2 to the fourth lens L4 needs to be increased, the color aberration is increased.

On the contrary, when f1 is decreased by deviating from a lower limit of Conditional Expression 2, the power of the first lens L1 becomes excessive and spherical aberration and coma aberration are thus decreased, such that it is difficult to meet the condition of improvement of the resolution and a curvature radius of the lens surface constituting the first lens L1 is decreased, it is difficult to process the lens surface.

$50 < v1 < 60$  [Conditional Expression 3]

$20 < v2 < 30$  [Conditional Expression 4]

$50 < v3 < 60$  [Conditional Expression 5]

$50 < v4 < 60$  [Conditional Expression 6]

Herein, v1 represents is an abbe number of the first lens, v2 represents an abbe number of the second lens, v3 represents an abbe number of the third lens, and v4 represents an abbe number of the fourth lens.

Conditional Expression 3 to Conditional Expression 6 represent conditions for abbe numbers of the first lens L1, the second lens L2, the third lens L3, and the fourth lens L4, respectively and the abbe number of the second lens L2 has a smaller value than the abbe numbers of the first lens L1, the third lens L3, and the fourth lens L4.

In general, in the case of the single lens, since a variance value increases when the abbe number decreases, variation in refractive index becomes larger, such that it is difficult to correct the color aberration, while since the variance value decreases when the abbe number increases, the variation in refractive index becomes smaller, such that the color aberration decreases.

Therefore, since it is difficult to correct the color aberration when using only the second lens L2 that meets Conditional Expression 4, the color aberration is corrected by combining the second lens L2 with the first lens L1 having smaller refractive index and larger abbe number than the second lens L2 in the optical system of the present invention.

Meanwhile, under such a condition, the first lens L1 has relatively smaller refractive index and relatively larger abbe number than the second lens L2, but it is preferable to form the third lens L3 and the fourth lens L4 by using the plastic aspheric lens that meets Conditional Expressions 5 and 6 in order to reduce aberration of light transmitting the second lens L2.

That is, the fourth lens L3 and the fourth lens L4 are preferably constituted by a plastic lens having larger abbe number than the second lens L2 in order to reduce various aberrations and distortion characteristics of the light transmitting the second lens L2.

Hereinafter, the optical system of the present invention will be described in more detail through a detailed value embodiment.

First to third embodiment described below all have a first lens L1 having positive refractive index, a second lens L2 that has a concave shape on both surfaces thereof and has negative refractive index, a third lens L3 that has a convex shape on the top, and a fourth lens L4 having a negative refractive index, wherein an aperture stop AS is installed between the first lens L1 and the second lens L2.

Further, an infrared ray filter or an optical filter OF configured by a cover glass coated with the infrared ray filter are provided between the fourth lens L4 and an image surface 11.

Further, both surfaces of the fourth lens L4 has a concave shape on an optical axis, and an image-side surface 8 has a shape having an inflection point and an object-side surface 7 is convexed upwards.

Meanwhile, an aspheric surface used in each embodiment below is acquired from Equation 1 and a conic constant K and 'E and a number following E' used as aspheric coefficients A, B, C, D, E, and F represent the power of 10. For example, E+02 represents $10^2$ and E-02 represents $10^{-2}$.

$$Z = \frac{cY^2}{1 + \sqrt{1-(1+K)c^2Y^2}} + AY^4 + BY^6 + CY^8 + DY^{10} + EY^{12} + FY^{14} + \ldots \quad \text{[Equation 1]}$$

Wherein,

Z: Distance in an optical-axis direction from a vertex of a lens

Y: Distance in a direction vertical to an optical axis c: Reciprocal number of a curvature radius r on the vertex of the lens K: Conic constant A, B, C, D, E, F: Aspheric coefficient

[First Embodiment]

Table 1 shown below shows a value example in accordance with the first embodiment of the present invention.

Figure 2A:
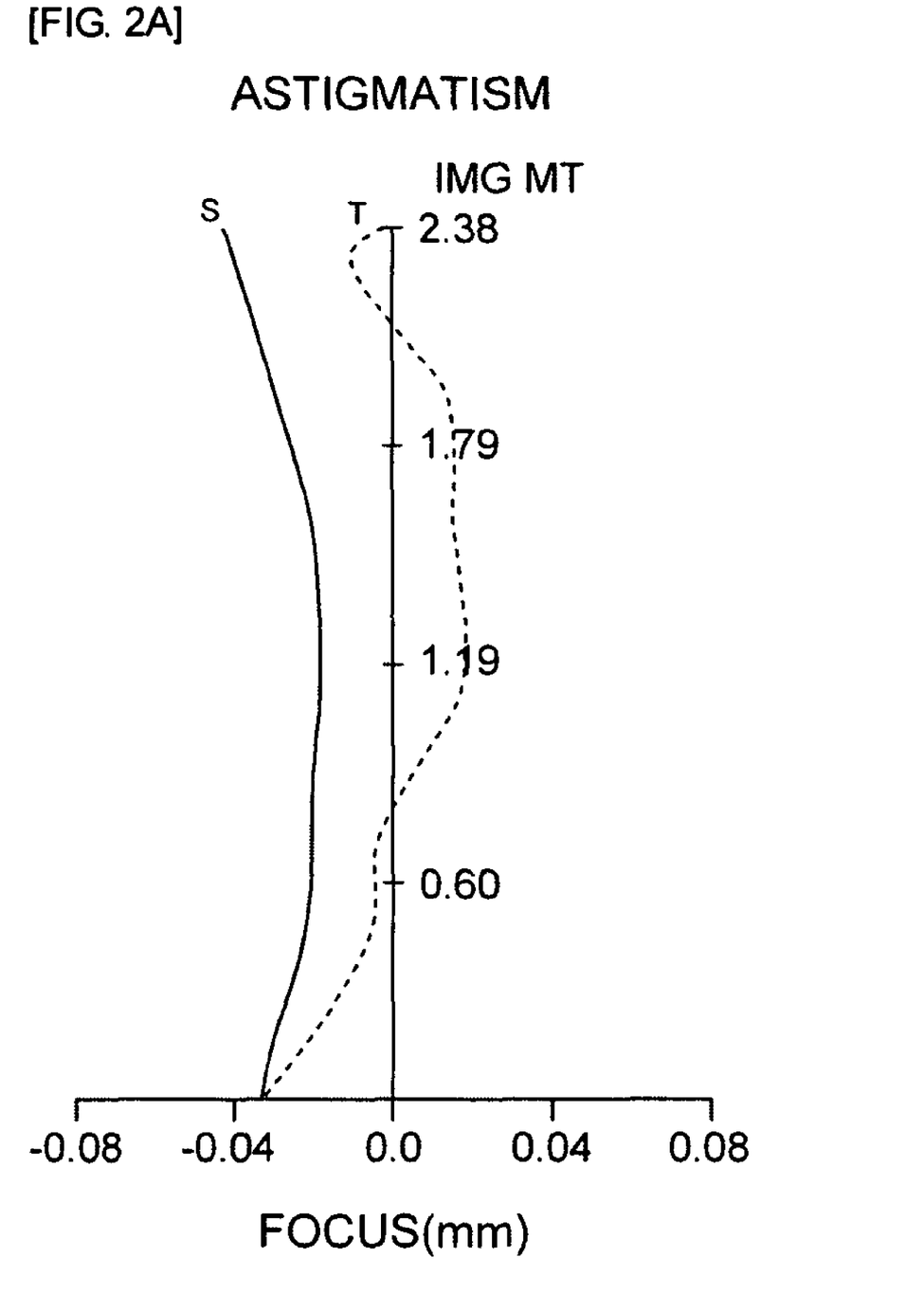
FIGS. 2A and 2B show astigmatism and distortion aberration of an optical system shown in Table 1 and FIG. 1, respectively.
Figure 2B:
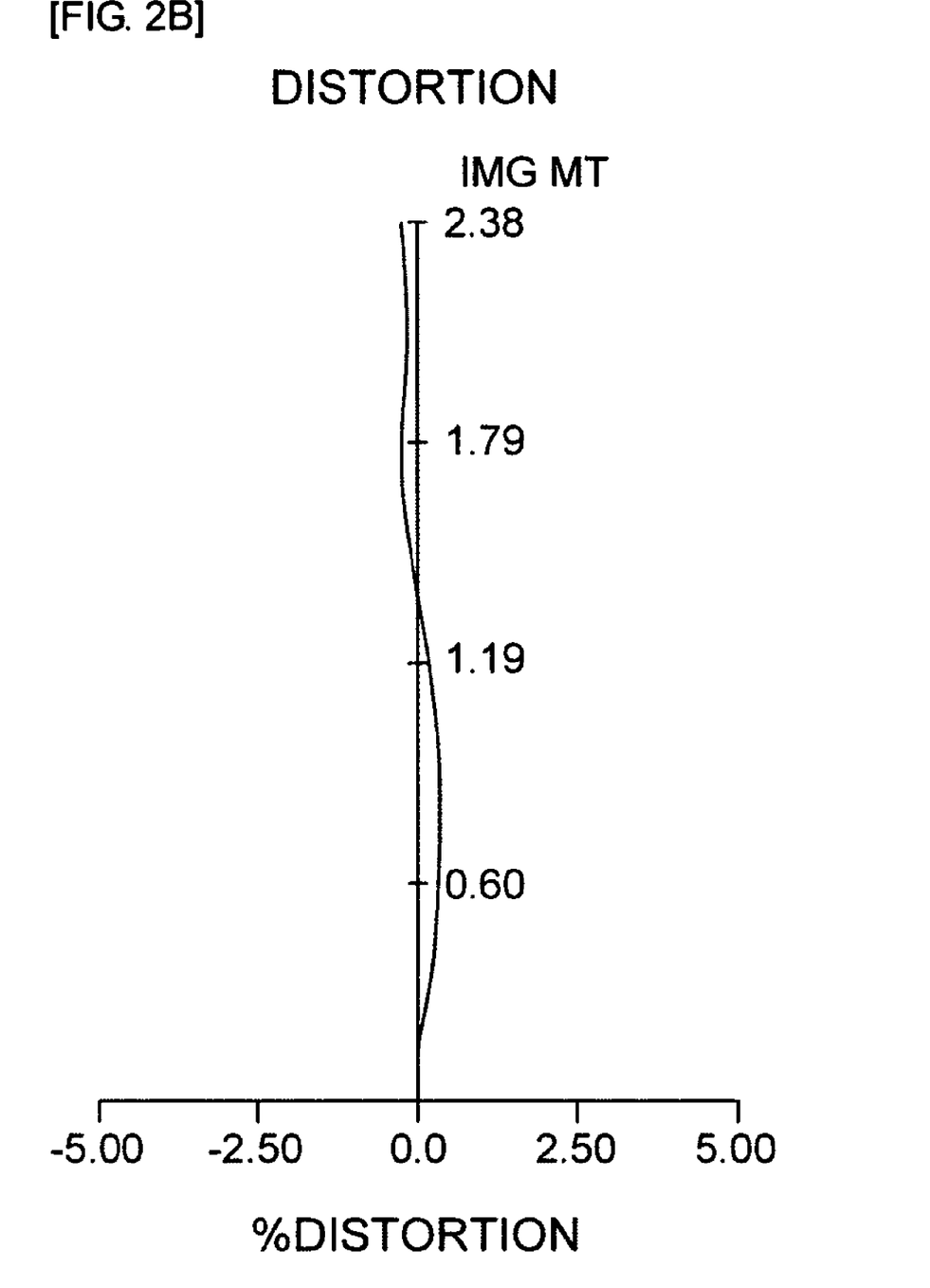
Figure 3:
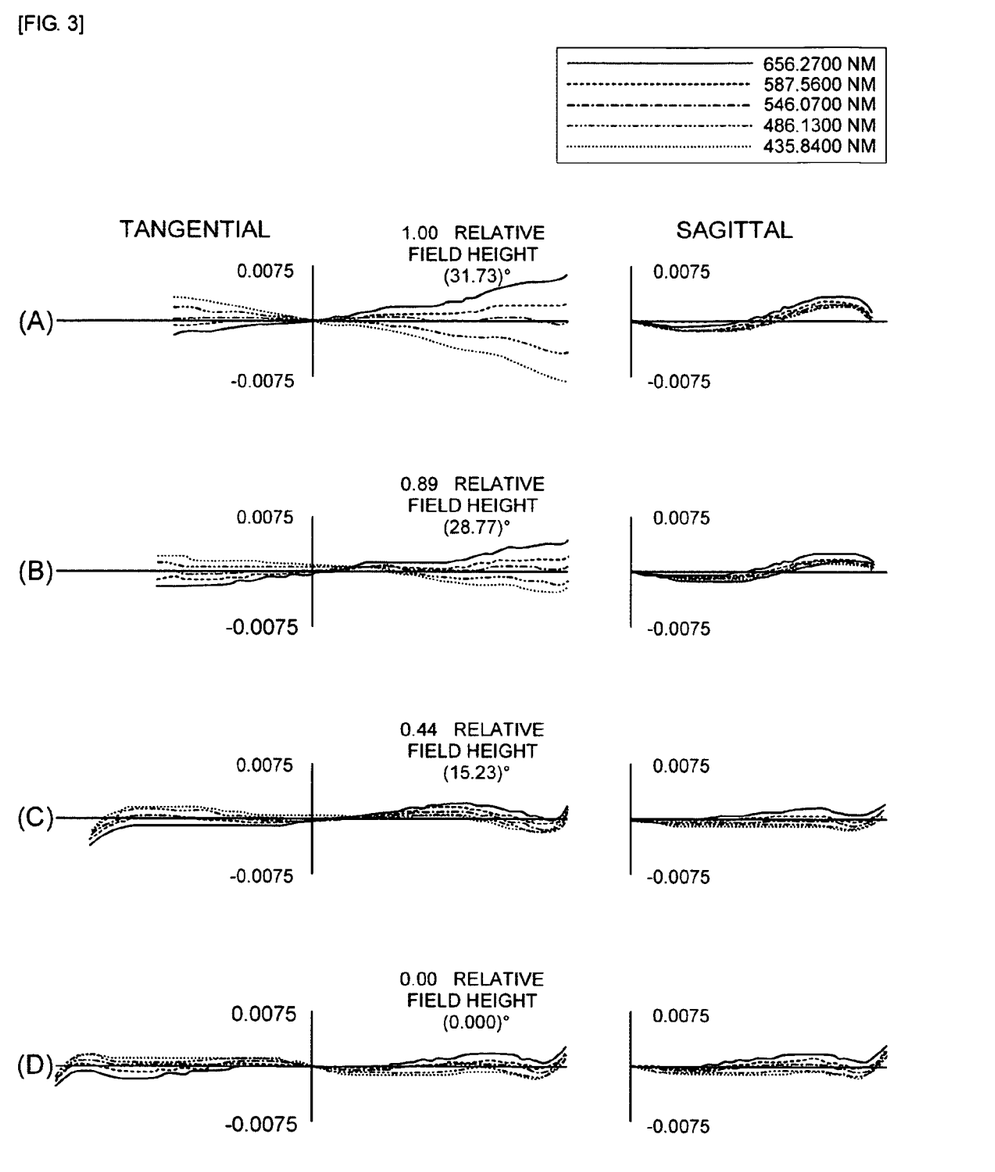
FIGS. 3A to 3D are diagrams of coma aberration for each field in accordance with a first embodiment.

Further, FIG. 1 is a configuration diagram showing a configuration of lenses of an optical system for a camera in accordance with a first embodiment of the present invention, FIGS. 2A and 2B show astigmatism and distortion aberration of an optical system shown in Table 1 and FIG. 1, respectively, and FIGS. 3A to 3D are diagrams of coma aberration for each field in accordance with a first embodiment. In addition, in the astigmatism diagram of FIG. 2A, 'S' represents sagital and T represents tangential.

In the first embodiment, a view angle is 64 degrees, a distance TL from an object-side surface 1 to the top surface of the first lens L1 is 4.2 mm, and an effective focus distance f of the entire optical system is 3.6 mm. Further, the first lens L1 to the fourth lens L4 all are configured by plastic lenses.

TABLE 1

| Surface Number | Curvature Radius (R) | Thickness or Distance (t) | Refractive Index (n) | Abbe Number (v) | Remark |
|---|---|---|---|---|---|
| *1 | 1.1180 | 0.52 | 1.54 | 56.1 | First lens |
| *2 | −20.000 | 0.04 | | | |
| *3 | −2.5995 | 0.29 | 1.61 | 28.0 | Second lens |
| *4 | 13.9311 | 0.60 | | | |
| *5 | −1.2391 | 0.64 | 1.54 | 56.1 | Third lens |
| *6 | −0.8493 | 0.26 | | | |
| *7 | −11.1013 | 0.48 | 1.54 | 56.1 | Fourth lens |
| *8 | 1.8033 | 0.33 | | | |
| 9 | ∞ | 0.30 | 1.51 | 64.2 | Optical filter |
| 10 | ∞ | 0.57 | | | |

In Table 1, a mark '*' prior to the surface number represents an aspheric surface and in the case of the first embodiment, all surfaces of the first lens L1, the second lens L2, the third lens L3, and the fourth lens L4 are the aspheric surfaces.

Further, values of aspheric coefficients of the first embodiment by Equation 1 are shown in Table 2.

TABLE 2

| Surface Number | K | A | B | C | D | E |
|---|---|---|---|---|---|---|
| 1 | 8.5443E−01 | 6.5925E−02 | 2.4991E−01 | −1.0237E+00 | 2.6062E+00 | −2.7888E+02 |
| 2 | 0.0000E+00 | 9.2051E−02 | −1.9125E−01 | −2.9919E−02 | −1.0119E+00 | 0.0000E+00 |
| 3 | 0.0000E+00 | 3.9522E−01 | −6.8182E−01 | 2.7710E−01 | 4.6848E−02 | −1.8011E+00 |
| 4 | 3.9645E+02 | 4.3974E−01 | −4.6650E−01 | 5.1422E−01 | 0.0000E+00 | 0.0000E+00 |
| 5 | 1.5795E−01 | −9.4959E−02 | −3.4422E−01 | 3.3529E−01 | −2.3004E−01 | −3.0885E−02 |
| 6 | −4.7539E+00 | −6.8096E−01 | 1.0131E+00 | −1.4091E+00 | 1.1213E+00 | −3.1691E−01 |
| 7 | 0.0000E+00 | −2.7240E−01 | 2.1927E−01 | −6.7453E−02 | 6.7395E−03 | 1.5205E−04 |
| 8 | −1.6809E−01 | −1.7990E−01 | 9.2976E−02 | −3.8317E−02 | 9.6753E−03 | 1.1123E−03 |

[Second Embodiment]

Table 3 shown below shows a value example in accordance with the second embodiment of the present invention.

Figure 4:
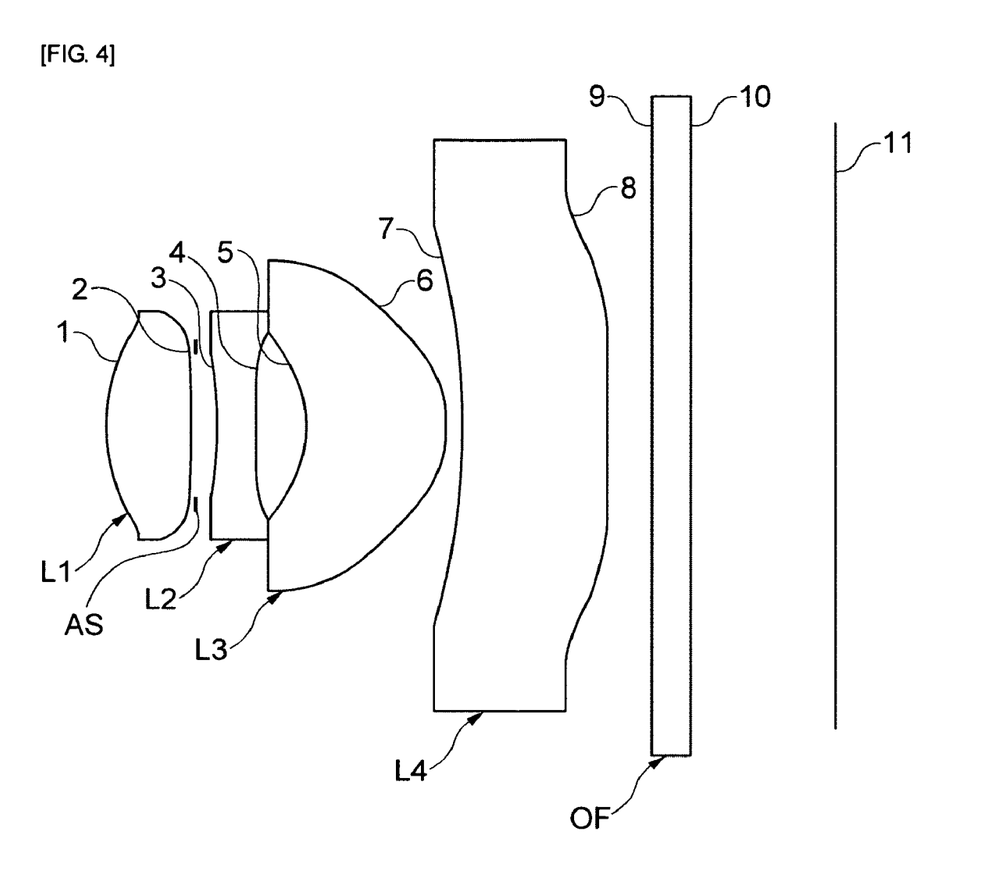
FIG. 4 is a configuration diagram showing a configuration of lenses of an optical system for a camera in accordance with a second embodiment of the present invention.
Figure 5A:
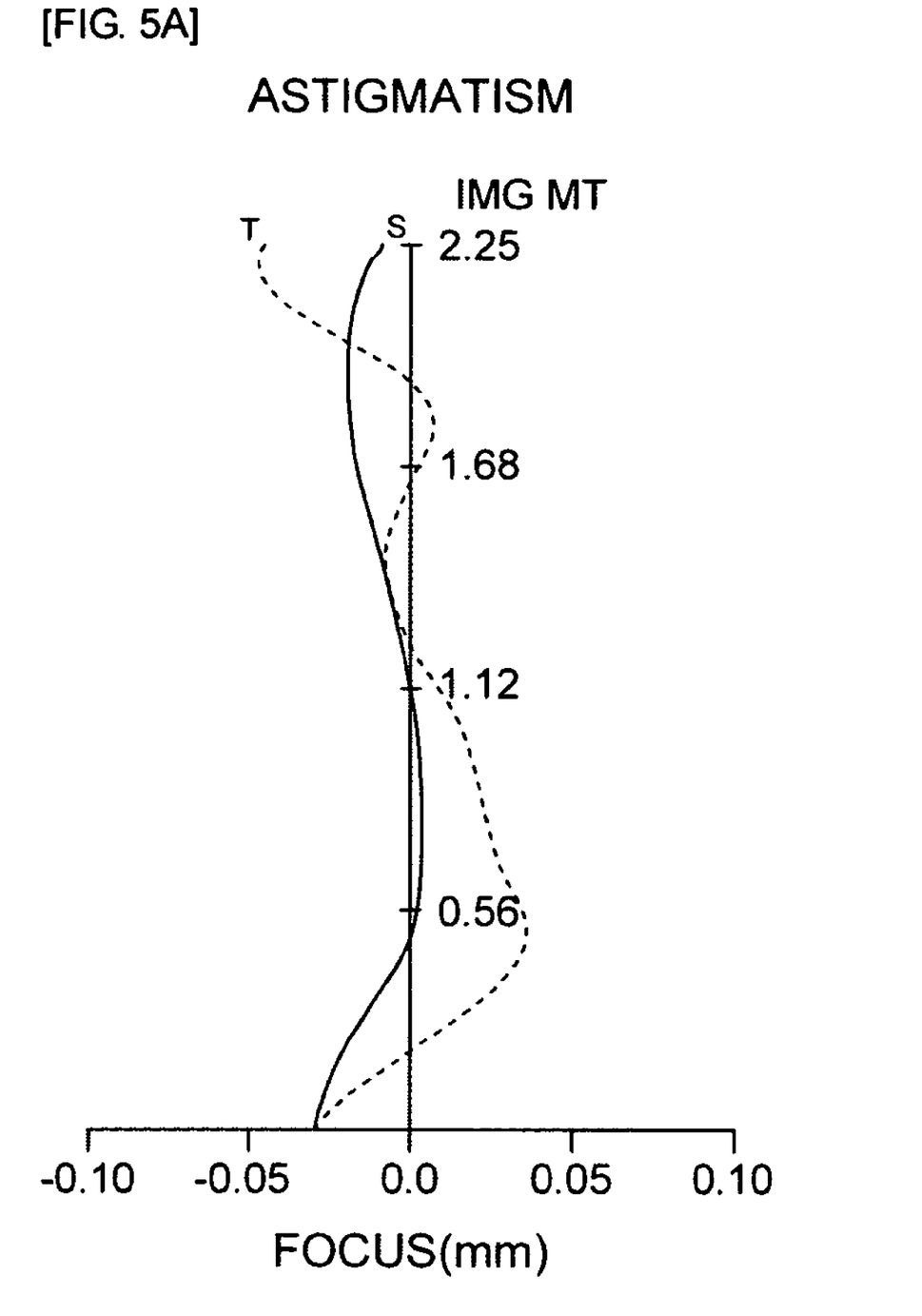
FIGS. 5A and 5B show astigmatism and distortion aberration of an optical system shown in Table 3 and FIG. 4, respectively.
Figure 5B:
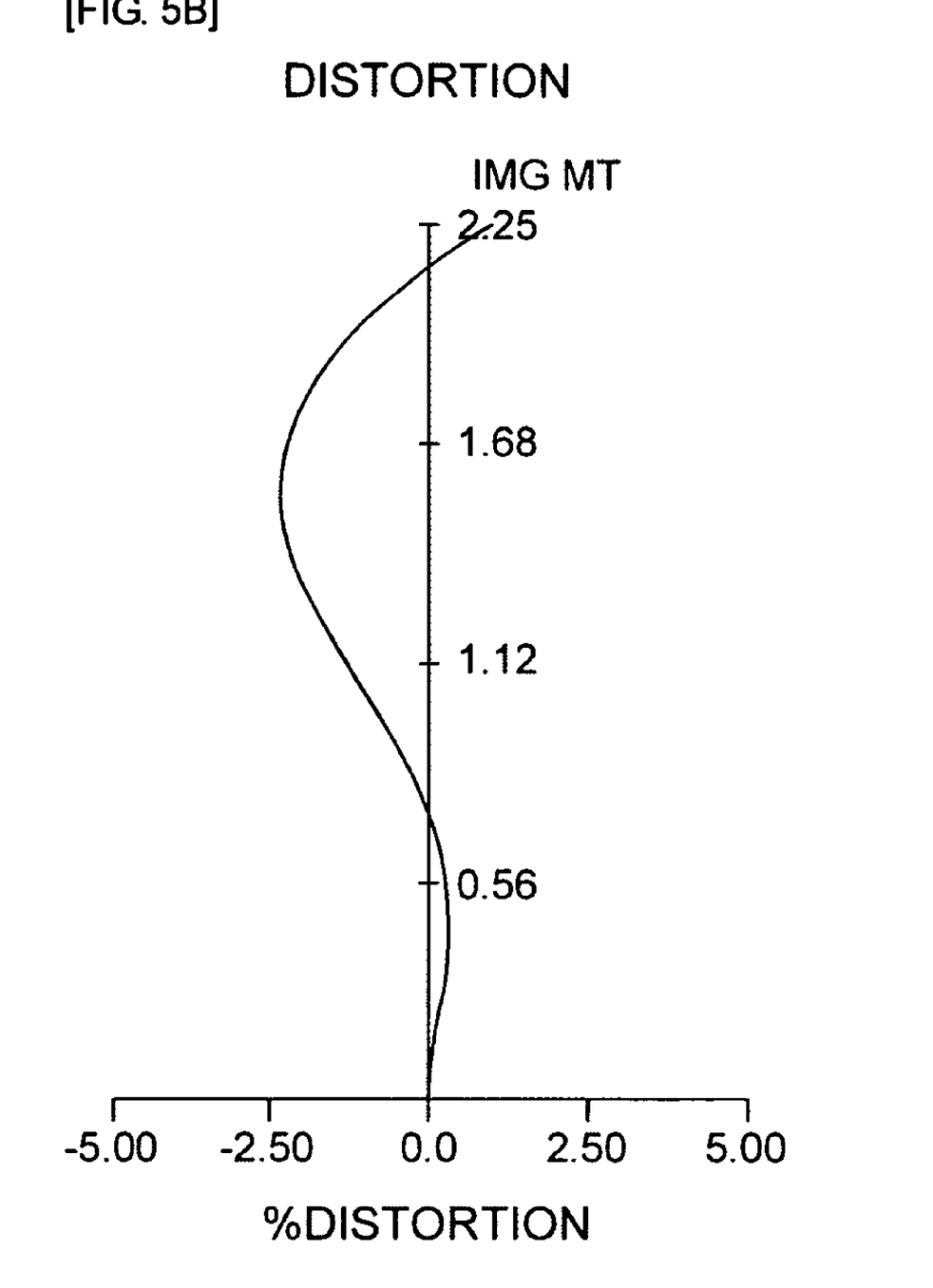
Figure 6:
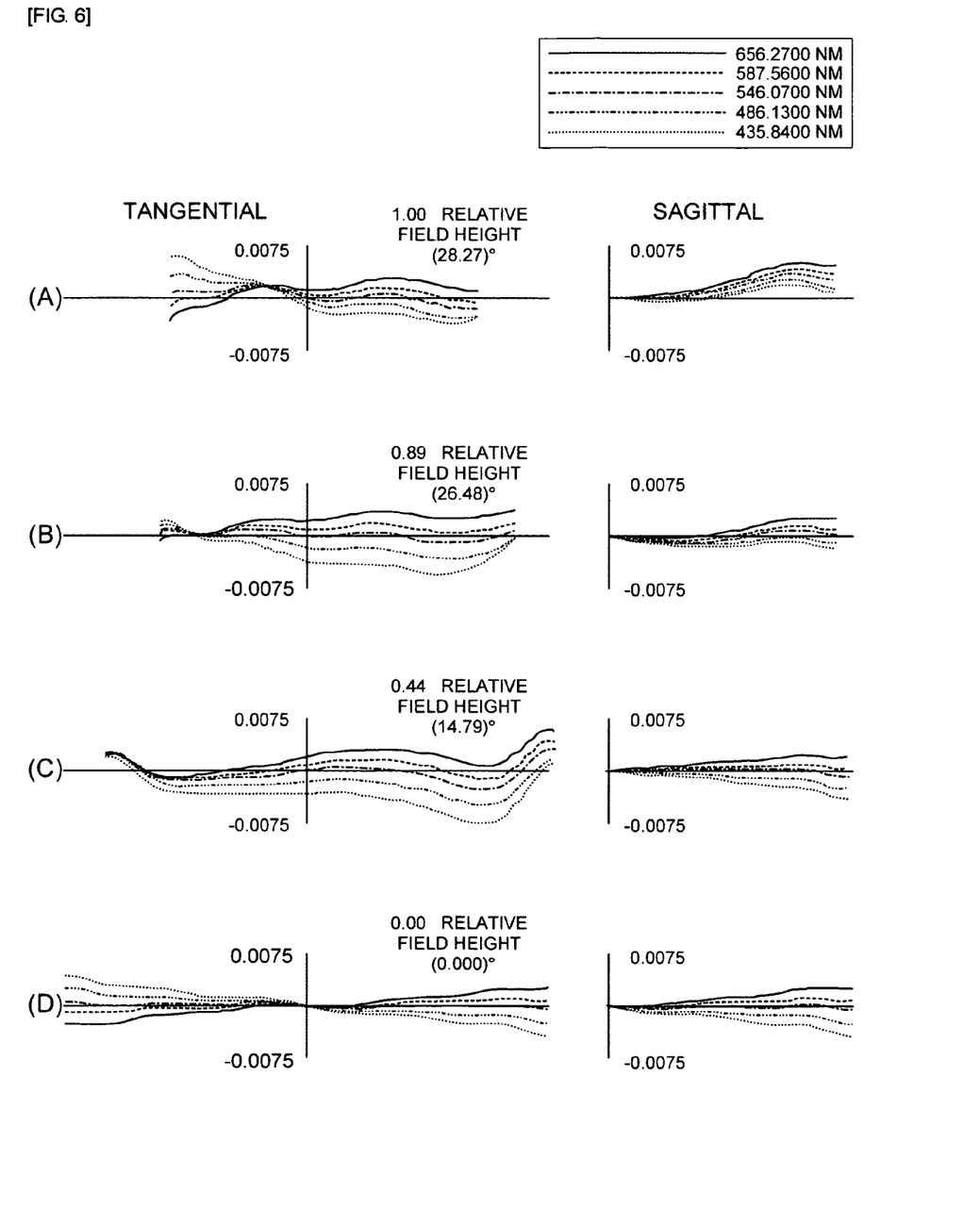
FIGS. 6A to 6D are diagrams of coma aberration for each field in accordance with a second embodiment.

Further, FIG. 4 is a configuration diagram showing a configuration of lenses of an optical system for a camera in accordance with a second embodiment of the present invention, FIGS. 5A and 5B show astigmatism and distortion aberration of an optical system shown in Table 3 and FIG. 4, respectively, and FIGS. 6A to 6D are diagrams of coma aberration for each field in accordance with a second embodiment.

In addition, in the astigmatism diagram of FIG. 5A, 'S' represents sagital and 'T' represents tangential.

In the second embodiment, the view angle is 50 degrees, the distance TL from the object-side surface 1 to the top surface of the first lens L1 is 5.5 mm, and the effective focus distance f of the entire optical system is 5.5 mm. Further, the first lens L1 to the fourth lens L4 all are configured by the plastic lenses.

TABLE 3

| Surface Number | Curvature Radius (R) | Thickness or Distance (t) | Refractive Index (n) | Abbe Number (v) | Remark |
|---|---|---|---|---|---|
| *1 | 1.3857 | 0.62 | 1.54 | 56.1 | First lens |
| *2 | −8.2216 | 0.04 | | | |
| *3 | −2.3215 | 0.29 | 1.61 | 28.0 | Second lens |
| *4 | −36.6864 | 0.38 | | | |
| *5 | −0.9627 | 1.05 | 1.54 | 56.1 | Third lens |
| *6 | −0.8791 | 0.10 | | | |
| *7 | −14.4172 | 1.10 | 1.54 | 56.1 | Fourth lens |
| *8 | 5.3227 | 0.32 | | | |
| 9 | ∞ | 0.30 | 1.51 | 64.2 | Optical filter |
| 10 | ∞ | 1.06 | | | |

In Table 3, the mark '*' prior to the surface number represents the aspheric surface and in the case of the second embodiment, all the surfaces of the first lens L1, the second lens L2, the third lens L3, and the fourth lens L4 are the aspheric surfaces.

Further, values of aspheric coefficients of the second embodiment by Equation 1 are shown in Table 4.

TABLE 4

| Surface Number | K | A | B | C | D | E |
|---|---|---|---|---|---|---|
| 1 | −1.0225E+00 | 5.4055E−02 | 2.1937E−01 | −1.1024E+00 | 2.5519E+00 | −2.4357E+00 |
| 2 | 0.0000E+00 | 8.2370E−02 | −2.9020E−01 | 5.3700E+00 | −5.5610E−00 | 0.0000E+00 |
| 3 | 0.0000E+00 | 3.8333E−01 | −7.6743E−01 | 7.0126E−02 | −7.3963E−02 | −6.1630E−01 |
| 4 | 2.7572E+03 | 4.1833E−01 | −5.3138E−01 | 7.9056E−01 | 0.0000E+00 | 0.0000E+00 |
| 5 | −1.4995E−01 | −6.5370E−02 | −3.7314E−01 | 8.1977E−01 | 7.7322E−01 | 3.3630E−01 |
| 6 | −4.2139E+00 | −7.2427E−01 | 1.0828E+00 | −1.4002E+00 | 1.0968E+00 | −3.3960E−01 |
| 7 | 0.0000E+00 | −2.4788E−01 | 2.1877E−01 | −6.7618E−02 | 6.4745E−03 | −6.8345E−05 |
| 8 | −2.6998E+01 | −1.9434E−01 | 9.9095E−02 | −3.7154E−02 | 9.8163E−03 | −1.1091E−03 |

[Third Embodiment]

Table 5 shown below shows a value example in accordance with the third embodiment of the present invention.

Figure 7:
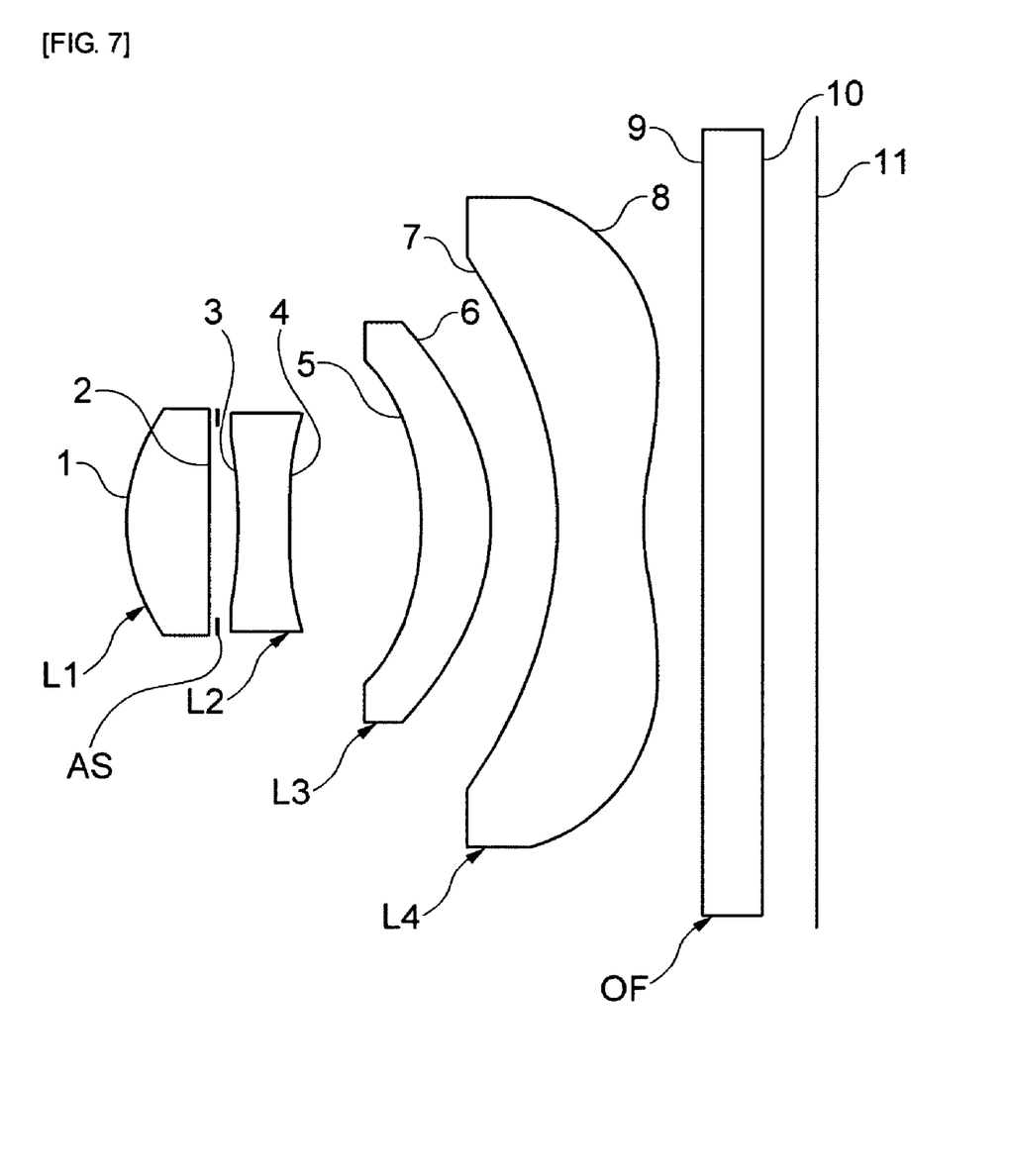
FIG. 7 is a configuration diagram showing a configuration of lenses of an optical system for a camera in accordance with a third embodiment of the present invention.
Figure 8A:
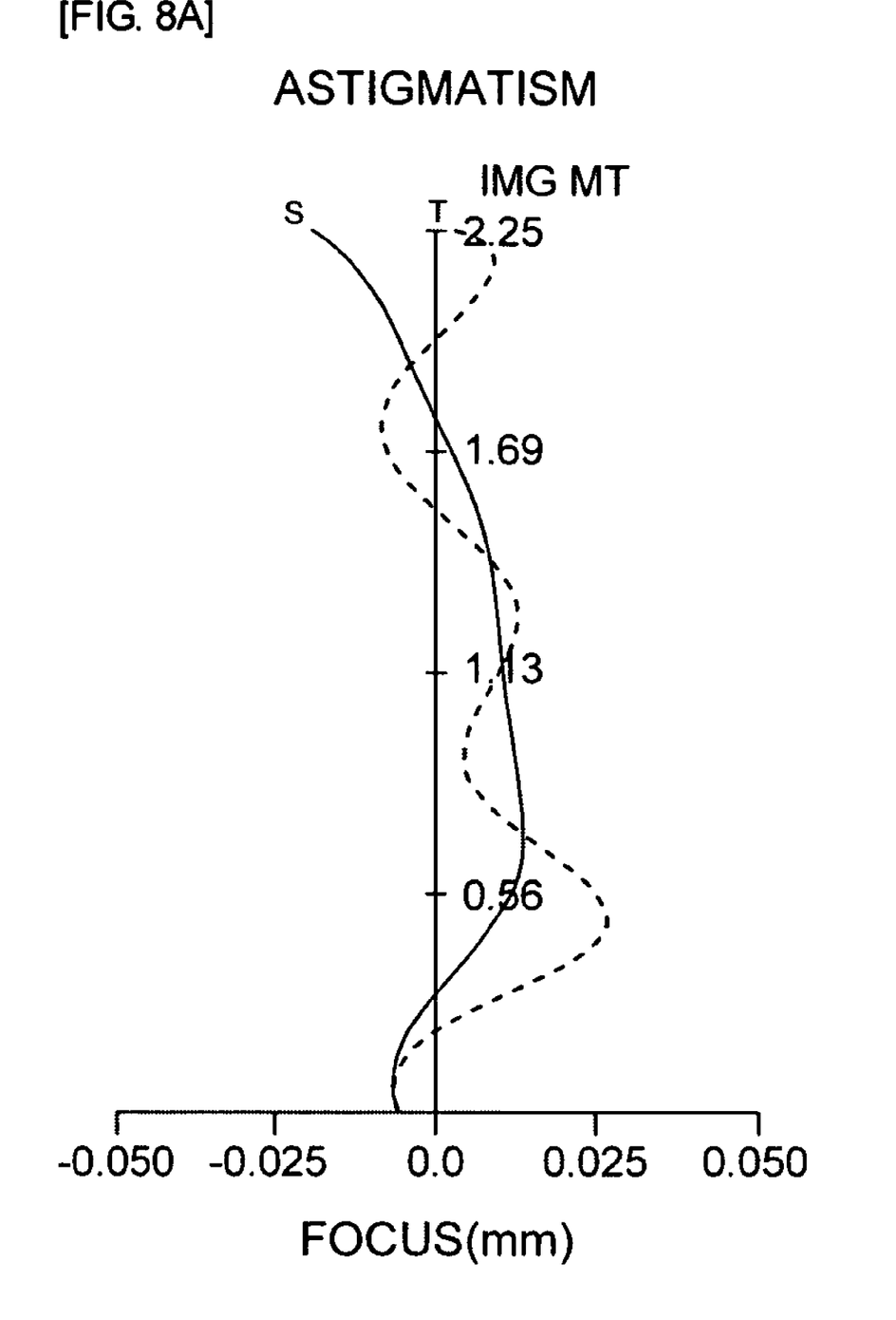
FIGS. 8A and 8B show astigmatism and distortion aberration of an optical system shown in Table 5 and FIG. 7, respectively.
Figure 8B:
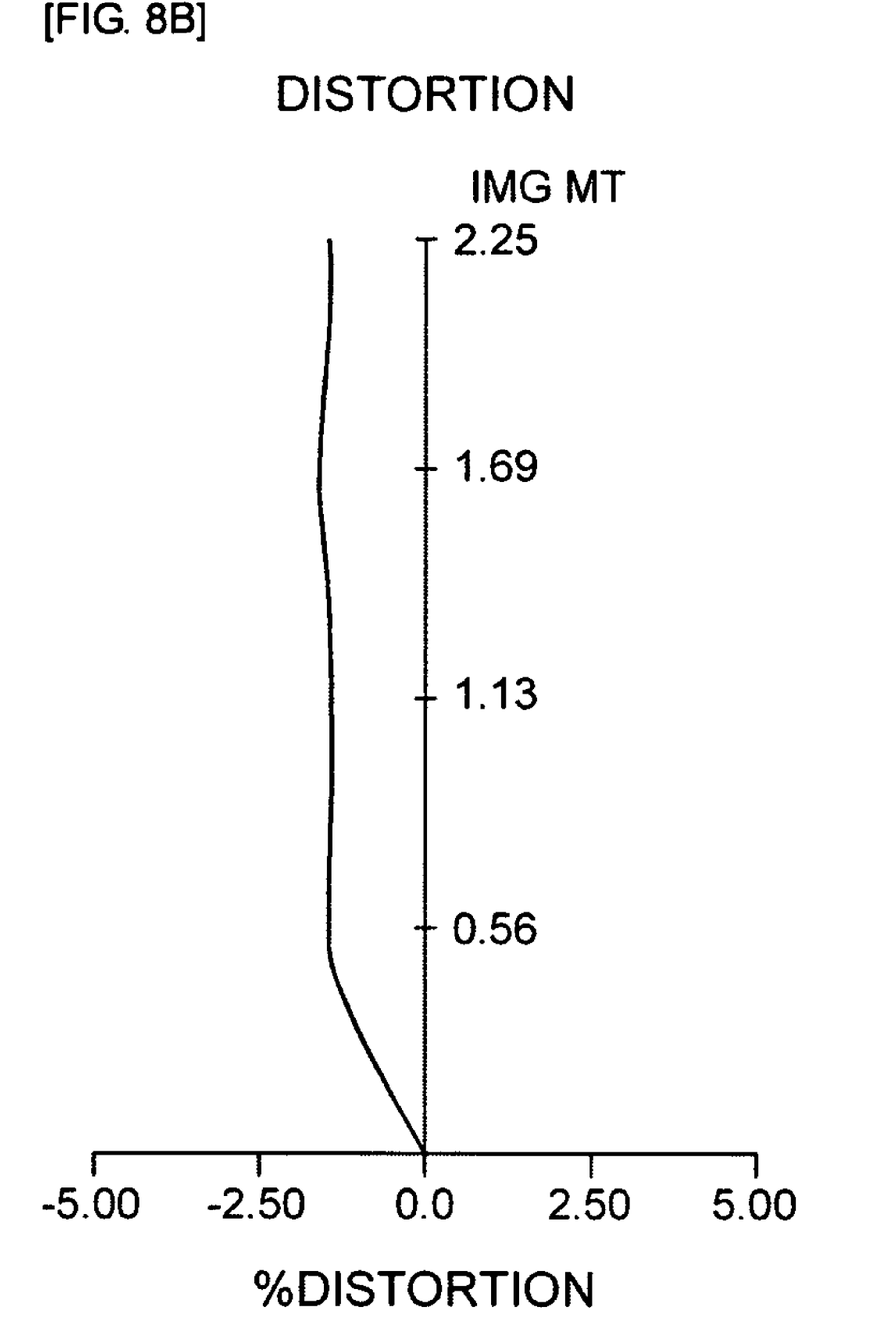
Figure 9:
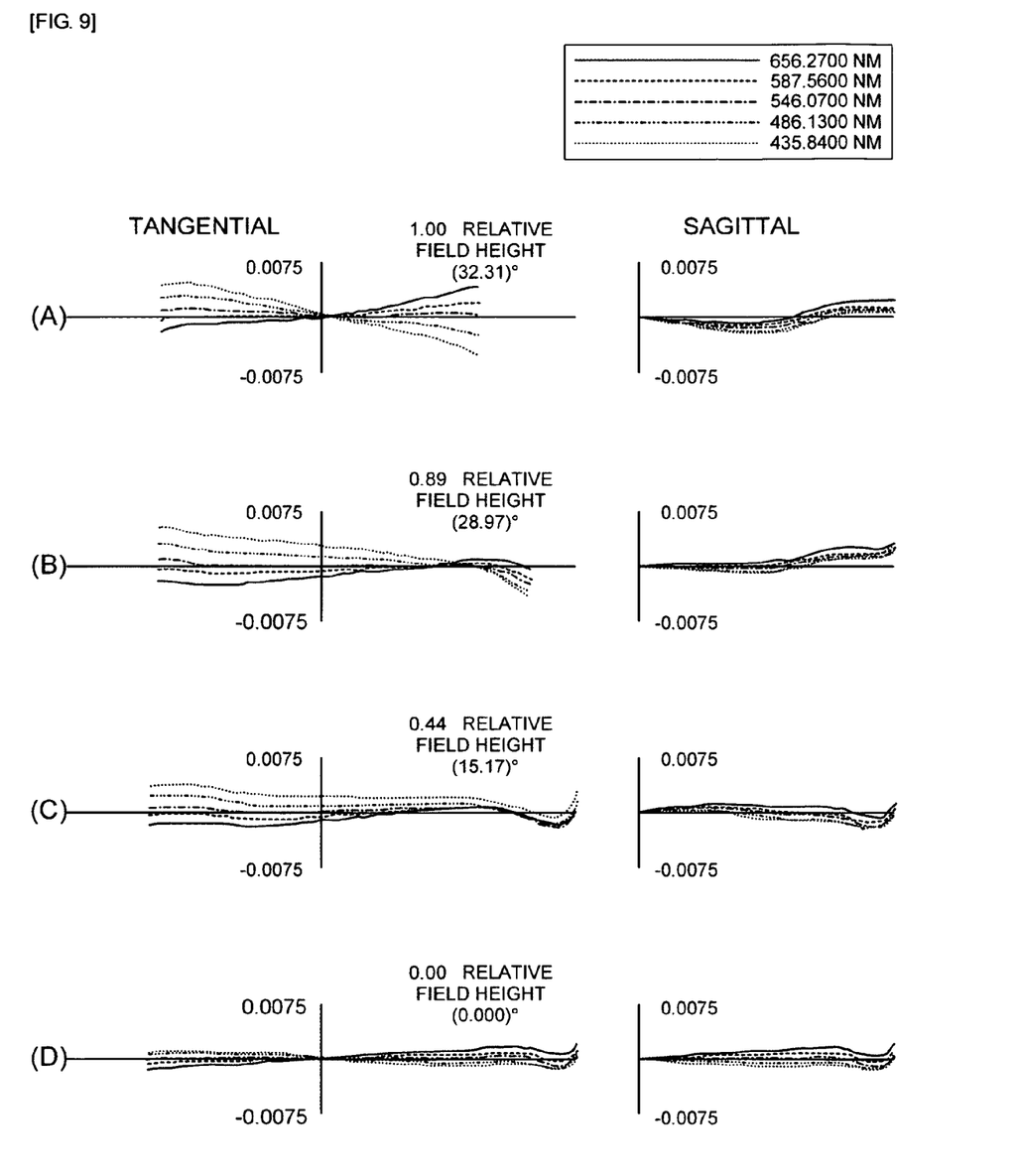
FIGS. 9A to 9D are diagrams of coma aberration for each field in accordance with a third embodiment.

Further, FIG. 7 is a configuration diagram showing a configuration of lenses of an optical system for a camera in accordance with a third embodiment of the present invention, FIGS. 8A and 8B show astigmatism and distortion aberration of an optical system shown in Table 5 and FIG. 7, respectively, and FIGS. 9A to 9D are diagrams of coma aberration for each field in accordance with a third embodiment. In addition, in the astigmatism diagram of FIG. 8A, 'S' represents sagital and 'T' represents tangential.

In the third embodiment, the view angle is 60 degrees, the distance TL from the object-side surface 1 to the top surface of the first lens L1 is 3.8 mm, and the effective focus distance f of the entire optical system is 3.8 mm. Further, the first lens L1 to the fourth lens L4 all are configured by the plastic lenses.

TABLE 5

| Surface Number | Curvature Radius (R) | Thickness or Distance (t) | Refractive Index (n) | Abbe Number (v) | Remark |
|---|---|---|---|---|---|
| *1 | 1.0705 | 0.45 | 1.54 | 56.1 | First lens |
| *2 | −69.8938 | 0.04 | | | |
| *3 | −2.8037 | 0.29 | 1.62 | 27.1 | Second lens |
| *4 | 10.9239 | 0.73 | | | |
| *5 | −1.6474 | 0.40 | 1.54 | 56.1 | Third lens |
| *6 | −0.9165 | 0.33 | | | |
| *7 | −3.2444 | 0.46 | 1.54 | 56.1 | Fourth lens |
| *8 | 1.2315 | 0.32 | | | |
| 9 | ∞ | 0.30 | 1.51 | 64.2 | Optical filter |
| 10 | ∞ | 0.30 | | | |

In Table 5, the mark '*' prior to the surface number represents the aspheric surface and in the case of the third embodiment, all the surfaces of the first lens L1, the second lens L2, the third lens L3, and the fourth lens L4 are the aspheric surfaces.

Further, values of aspheric coefficients of the third embodiment by Equation 1 are shown in Table 6.

TABLE 6

| Surface Number | K | A | B | C | D | E |
|---|---|---|---|---|---|---|
| 1 | −8.6056E−01 | 6.6449E−02 | 1.9484E−01 | −9.9015E−00 | 2.7149E+00 | −3.2734E+00 |
| 2 | 0.0000E+00 | 3.9477E−02 | −1.1574E−01 | 1.7245E−01 | −1.1072E+00 | 0.0000E+00 |
| 3 | 0.0000E+00 | 4.1711E−01 | −6.1756E−01 | 5.5675E−01 | 5.4830E−01 | −3.7899E+00 |
| 4 | 2.8091E+02 | 4.8782E−01 | −2.6787E−01 | 2.7896E−01 | 0.0000E+00 | 0.0000E+00 |
| 5 | −4.4749E+00 | 4.5902E−02 | −5.5393E−01 | 4.6926E−01 | −2.5849E−02 | −2.5819E−01 |
| 6 | 8.2644E+00 | −5.3795E−01 | 9.9456E−01 | −1.4397E+00 | 1.1076+E00 | −3.1478E−01 |
| 7 | 0.0000E+00 | −2.6981E−01 | 2.2182E−01 | −6.6848E−02 | 6.8978E−03 | 1.8613E−04 |
| 8 | −2.4124E+01 | −1.7408E−01 | 9.04447E−02 | −3.8925E−02 | 9.5681E−03 | −1.1678E−03 |

Through the embodiments, as shown in FIGS. 2, 3, 5, 6, 8, and 9, it can be verified that an optical system having excellent aberration characteristics can be acquired.

Meanwhile, values of Conditional Expression 1 and Conditional Expression 2 for the first to third embodiments are shown in Table 7 below.

TABLE 7

| | First Embodiment | Second Embodiment | Third Embodiment |
|---|---|---|---|
| Conditional Expression 1 (TL/f) | 1.16 | 1.44 | 1.0 |
| Conditional Expression 2 (f1/f) | 0.54 | 0.58 | 0.51 |

As shown in Table 7, it can be verified that the first to third embodiments of the present invention meet Conditional Expression 1 and Conditional Expression 2.

Other features and advantages of the present invention will become apparent to those skilled in the art from the following detailed description. It should be understood, however, that the detailed description and specific examples, while indicating preferred embodiments of the present invention, are given by way of illustration and not limitation. Many substitutions, changes and modifications within the scope of the present invention may be made without departing from the spirit thereof and the invention includes all such modifications.

What is claimed is:

1. An optical system for a camera, comprising:
   a first lens having a positive refractive index and a convex shape toward an object side of the optical system;
   a second lens having a negative refractive index and a concave shape at both image-side and object surfaces thereof;
   a third lens having a positive refractive index and a convex shape upwards at a peripheral portion of the third lens; and
   a fourth lens having a negative refractive index that has a concave surface toward the object-side thereof on the optical axis, and has at least one inflection point toward the image-side thereof,
   wherein an aperture stop to block unnecessary light is provided between the first and second lenses.

2. The optical system for a camera of claim 1, wherein a top surface of the fourth lens comprises a surface concaved upwards on the optical axis and a convex surface convexed upwards in a peripheral part.

3. The optical system for a camera of claim 1, wherein the optical system meets 0.80<TL/f<1.45 with respect to an optical-axis direction size, where TL represents a distance from an object-side surface of the first lens to the image surface and f represents an effective focus distance of the entire optical system.

4. The optical system for a camera of claim 1, wherein the optical system meets 0.7<f1/f<1.0 with respect to an optical-axis direction size, where f1 represents a focus distance of the first lens and f represents an effective focus distance of the entire optical system.

5. The optical system for a camera of claim 1, wherein the first to fourth lenses meet 50<v1<60, 20<v2<30, 50<v3<60, and 50<v4<60 with respect to correction of color aberration for resolution, respectively where v1 represents an abbe number of the first lens, v2 represents an abbe number of the second lens, v3 represents an abbe number of the third lens, and v4 represents an abbe number of the fourth lens.

6. The optical system for a camera of claim 1, wherein image-side and object surfaces of each of the first to fourth lenses comprise an aspheric surface.

7. The optical system for a camera of claim 6, wherein the first to fourth lenses comprise plastic lenses.

8. The optical system for a camera of claim 2, wherein the optical system meets 0.80<TL/f<1.45 with respect to an optical-axis direction size, where TL represents a distance from an object-side surface of the first lens to the image surface and f represents an effective focus distance of the entire optical system.

9. The optical system for a camera of claim 2, wherein the optical system meets 0.7<f1/f<1.0 with respect to an optical-axis direction size, where f1 represents a focus distance of the first lens and f represents an effective focus distance of the entire optical system.

10. The optical system for a camera of claim 6, wherein the optical system meets 0.80<TL/f<1.45 with respect to an optical-axis direction size, where TL represents a distance from an object-side surface of the first lens to the image surface and f represents an effective focus distance of the entire optical system.

11. The optical system for a camera of claim 6, wherein the optical system meets 0.7<f1/f<1.0 with respect to an optical-axis direction size, where f1 represents a focus distance of the first lens and f represents an effective focus distance of the entire optical system.

12. The optical system for a camera of claim 6, wherein the first to fourth lenses meet 50<v1<60, 20<v2<30, 50<v3<60, and 50<v4<60 with respect to correction of color aberration for resolution, respectively, where v1 represents an abbe number of the first lens, v2 represents an abbe number of the second lens, v3 represents an abbe number of the third lens, and v4 represents an abbe number of the fourth lens.

* * * * *

UNITED STATES PATENT AND TRADEMARK OFFICE
CERTIFICATE OF CORRECTION

PATENT NO. : 8,320,060 B2
APPLICATION NO. : 12/654672
DATED : November 27, 2012
INVENTOR(S) : Yong Joo Jo It is certified that error appears in the above-identified patent and that said Letters Patent is hereby corrected as shown below:

Column 10, Line 57, In Claim 5, delete "respectively" and insert -- respectively, --, therefor.
Column 10, Line 57, In Claim 5, delete "v1represents" and insert -- v1 represents --, therefor.

Signed and Sealed this
Nineteenth Day of February, 2013

Teresa Stanek Rea
*Acting Director of the United States Patent and Trademark Office*